(12) United States Patent
Guzman

(10) Patent No.: US 12,474,152 B2
(45) Date of Patent: Nov. 18, 2025

(54) FINISHING TAPE

(71) Applicant: David Guzman, Pompano Beach, FL (US)

(72) Inventor: David Guzman, Pompano Beach, FL (US)

( * ) Notice: Subject to any disclaimer, the term of this patent is extended or adjusted under 35 U.S.C. 154(b) by 410 days.

(21) Appl. No.: 18/300,034

(22) Filed: Apr. 13, 2023

(65) Prior Publication Data

US 2023/0341219 A1 Oct. 26, 2023

Related U.S. Application Data

(60) Provisional application No. 63/363,431, filed on Apr. 22, 2022.

(51) Int. Cl.
*G01B 3/10* (2020.01)
*G01B 3/1084* (2020.01)
*E04G 21/18* (2006.01)

(52) U.S. Cl.
CPC .......... *G01B 3/1084* (2013.01); *E04G 21/185* (2013.01); *G01B 2003/1097* (2013.01)

(58) Field of Classification Search
CPC .. G01B 3/1003; G01B 3/1084; G01B 3/1089; G01B 2003/1097
USPC .......... 33/1 G, 494, 758, 759, 679.1
See application file for complete search history.

(56) References Cited

U.S. PATENT DOCUMENTS

| | | | |
|---|---|---|---|
| 3,863,348 A * | 2/1975 | Herbst | G01B 3/04 33/494 |
| 4,367,590 A | 1/1983 | Winter et al. | |
| 4,845,858 A * | 7/1989 | Thomas | E04G 21/1891 33/759 |
| 4,942,670 A | 7/1990 | Brandt | |
| 5,012,590 A | 5/1991 | Wagner et al. | |
| 5,107,601 A * | 4/1992 | Semchuck | A47K 10/10 33/759 |
| 5,280,921 A * | 1/1994 | Milburn | G01B 3/11 33/759 |
| 5,627,763 A * | 5/1997 | Carlson | E04B 1/35 703/1 |
| 6,145,215 A * | 11/2000 | Graston | G01B 3/004 33/759 |
| 6,397,487 B1 | 6/2002 | Welch et al. | |
| 7,533,473 B2 | 5/2009 | Chua | |
| 8,225,521 B1 * | 7/2012 | Mooney | G01B 3/1003 33/759 |
| 8,789,286 B1 | 7/2014 | Vieczorek, Jr. | |

(Continued)

*Primary Examiner* — George B Bennett
(74) *Attorney, Agent, or Firm* — McHale & Slavin, P.A.

(57) ABSTRACT

A finishing tape is disclosed for use in positioning fasteners for securing building elements. The finishing tape further provides masking for immediate coating of the fastener or plug after installation. The finishing tape is formed from a flexible substrate having pressure-sensitive adhesive attached to a back side for adhesion to building construction materials and indicia imprinted on a top side. Apertures are equidistantly spaced along the length of the substrate with gun tip markings on each side of the apertures to provide a visual indication where to position the gun tip for inserting a screw or nail fastener. The indicia serve as visual templates for establishing proper location for fastener placement for attachment of a construction member, wherein said finishing tape provides proper and symmetrical fastener placement.

18 Claims, 3 Drawing Sheets

(56) References Cited

U.S. PATENT DOCUMENTS

2002/0038518 A1* 4/2002 Barrows ............. E04G 21/1891
33/758
2002/0148134 A1* 10/2002 Meyer .................. G01B 3/1004
33/759
2023/0266110 A1* 8/2023 Hatzopoulos .......... G01B 3/006
33/758

* cited by examiner

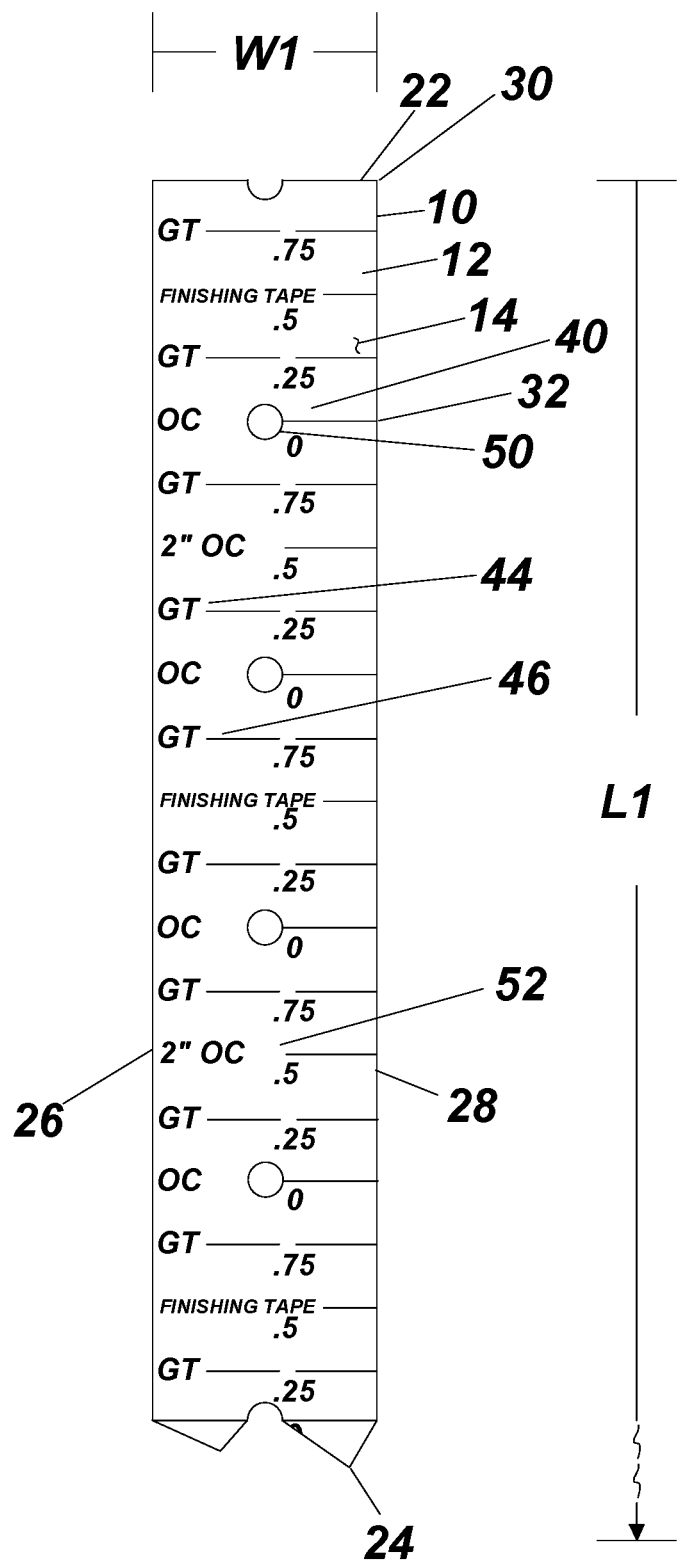
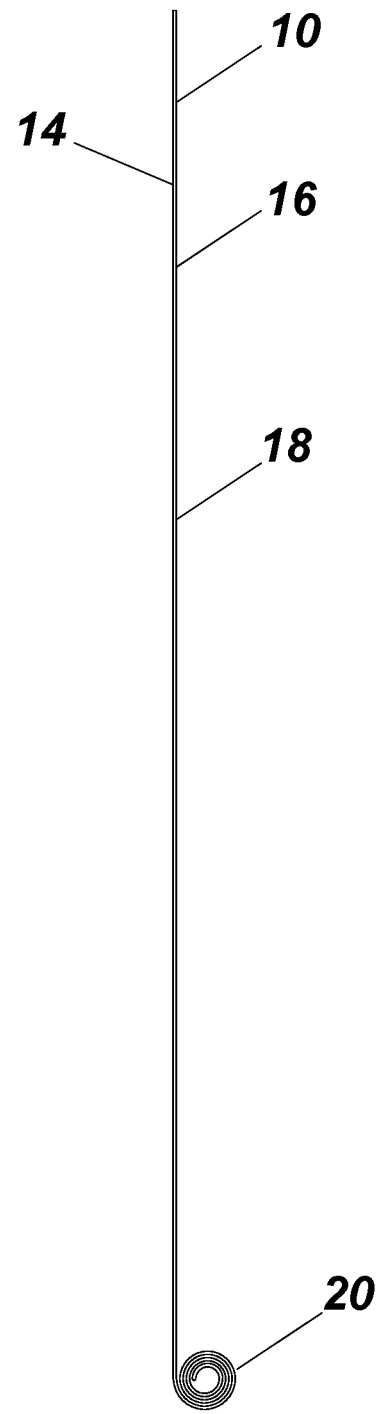
Fig. 1
Fig. 2

FINISHING TAPE

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/363,431, entitled "FINISHING TAPE" filed Apr. 22, 2022, the contents of which is incorporated herein by reference.

FIELD OF THE INVENTION

This invention relates to the field of construction and, in particular, to a finishing tape indicia and fastener positioning apertures.

BACKGROUND OF THE INVENTION

Building construction requires mechanical fasteners, such as nails, screws, staples, for securing building elements. Proper placement of the fasteners is critical to obtain superior joining strength, symmetry of exposed fasteners, and provide an ascetically pleasing appearance.

For instance, a rafter tail added to a soffit is a popular building addition. Whether the rafter tail is constructed from wood or plastic, spacing of fasteners for securing the building element is very important. If the spacing is too far apart, the rafter tail may sag or lack sufficient strength to withstand high winds. If the spacing is too close, the excess fasteners can detract from the appearance, and waste time in installing and covering the fasteners. Fastener positioning is especially noticeable when fasteners are positioned closely to each other.

Once the building element is secured by the fasteners, the fasteners can typically concealed using a coating of caulk or paint. Applying the coating may be performed with a caulk gun brush, finger, or the like applicator causing the coating to be spread across the fastener. An installer commonly uses their finger, a blade, or brush to smooth out the coating in hopes of avoiding the need to mask around the fastener. This technique typically leaves a trail even by a seasoned installer. Masking with tape around each fastener is labor intensive, cost prohibitive, and for that reason seldom performed.

Construction templates are known in the art and include: U.S. Pat. No. 8,789,286 which discloses a builder's layout tape with nail template that includes a measuring blade retractably extensible from within a circular housing wherein a plurality of holes are rendered at specific lengths along the measuring blade, each of said holes being configured to receive a fastener therethrough, wherein the measuring blade may be secured to a desired position along a work piece, whereby specific relative distances are readily ascertained without the need of relaying or repeatedly resetting the measuring blade.

U.S. Pat. No. 7,533,473 discloses a non-structural shear wall nailing template which bears a pattern of shear wall nailing pattern markings. The template is made of an inexpensive sheeting material that will not interfere with the further construction of the building if the template remains in-situ after construction of the shear wall. In one example, the template is a strip. The strip bears lettering that indicates the type of nailing pattern to which the nailing pattern markings conform. After fixing the template to one or more sheathing panels such that the template is aligned in a predefined way with respect to framing members behind the panel(s), nails are driven at the locations of the markings on the template. By driving a nail at the location of each template marking, the shear wall is constructed with proper nail spacing. A set of templates is provided to facilitate nailing in different shear wall nailing patterns.

U.S. Pat. No. 6,397,487 discloses a tape woven on-grain and has printed thereon at repetitive intervals an optically converging marking pattern which converges onto a locating pattern. The converging patterns each converge on opposite sides of a rectangular box which designates where a board or other structural component will most preferably be located. Within the rectangular box is an additional line which subdivides the box equally into two parts and which contains at its center a small diamond. The diamond identifies the geometric center of the structural component, for nailing or other purposes.

U.S. Pat. No. 5,012,590 discloses a layout tape for use in positioning building materials, such as studding, joists and rafters, in a building, wherein the tape is intended to be left in place within the building upon completion. The layout tape preferably has an adhesive backing facilitating positioning/mounting thereof at a point of use and an indicia/design bearing surface serving to indicate to a user the direction of layout, centers in desired multiples of unit lengths, and right/left material mounting positions in relation to such centers.

U.S. Pat. No. 4,942,670 discloses an adhesive template tape for aligning of building construction members, particularly for establishing of locations and spacing for equispaced construction members such as, for instance, studs in wall framing construction; the adhesive template tape including longitudinally equidistantly spaced, visually contrasting fields corresponding to standardized spacings and thickness sizes of building construction members. In use, the adhesive template tape is adhesively affixed to and along construction members, and other construction members are aligned with the visually contrasting fields on the tape and fastened thereover.

U.S. Pat. No. 4,367,590 discloses a calibrated tape capable of being separated into halves along a central portion thereof. The tape has indicia thereon which represent units of distance, each half of the tape having the same indicia as the other half. The tape is adapted to be secured to a pair of adjacent plates which are used to form the upper and lower plates of a wall of the type having spaced, vertical studs secured to the plates. The plates are first tacked together in side-by-side relationship and the tape is applied to both plates. Then the plates are separated, causing the separation of the halves of the tape, the halves remaining on respective plates to form guides for locating the positions at which the ends of the studs are to be attached to the plates. Several embodiments of the tape are described. A second tape is used over the first tape to represent the locations for window and door openings in the wall.

What is needed in the industry is an adhesive tape template having apertures to direct the installer for proper placement of fasteners wherein the fasteners pass through the aperture and the tape template operates as masking to prevent a fastener coating trail. The template has markings for placement of the gun tip, and indicia for locating the assembly leading edge. After the fastener is installed, the coating can be applied and the tape template can then be removed and discarded.

SUMMARY OF THE INVENTION

A finishing tape formed from a flexible substrate having pressure-sensitive adhesive attached to a back side for adhesion to building construction materials. The finishing tape is disclosed for use in positioning fasteners during construction wherein the tape further provides masking for ease of caulking or painting after fastener installation. The finishing tape can be attached to the construction material during the manufacturing step or during installation. The tape includes indicia spaced along at least one edge of said flexible substrate and extends inwardly along the length of the flexible substrate. The indicia beginning with a first mark, preferably a 1 inch numeral mark reduced to a defined as a zero base line by ¼ inch markings. Apertures are equidistantly spaced from every zero base line along the length of the flexible substrate. A gun tip marking on each side of the aperture provides a visual indication where to position the gun tip when using the gun for inserting a screw, staple or nail fastener. Indicia serve as visual templates for establishing proper location for fastener placement for attachment of a finishing construction member to a support construction member, the fastener placement provides proper fastener placement with minimal fastener employment.

An objective of the invention is to simplify the finishing process by providing an on-center finishing tape that provides precise placement of fasteners to prevent over nailing and nonsymmetrical staggered nailing.

Still another objective of the invention is to provide improved fastener placement for building materials using an aperture with a mark for positioning of a fastener gun, wherein installation of the fasteners is per manufacturer's specifications.

Another objective of the invention is to provide symmetrical location of fastener placement and plugging.

Yet still another objective of the invention is to provide a finishing tape having apertures sized to provide masking for the surrounding area, wherein a coating can be placed over the aperture to provide a masked area to prevent excess coating from being wiped over the fastener placed through the aperture.

Another objective of the invention is to provide a finishing tape in widths of 0.75 inch (1.9 cm), 1.5 inch (3.8 cm), 3 inch (7.6 cm), and 6 inch (15.2) with apertures specifically positioned, the edge of the tape providing straight line masking.

Still another objective of the invention is to allow the use of unskilled labor to achieve skilled performance, wherein fastener placement is directed by the finishing tape providing repetitive fastener placement between adjoining elements, and includes an aperture that operates to provide the position for caulking/painting and masking of the surrounding area.

Another objective of the invention is to expedite installation.

Still another objective of the invention is to provide a finishing tape having color coded indicia for ease of on-center spacing.

Yet still another objective of the invention is to provide a finishing tape for use in caulking or painting along seams, MITRE joints, beams with cleats, brackets, rafter rails, column joints, siding and trim door casing, cabinets, metal products and like forms of construction.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

BRIEF DESCRIPTION OF THE DRAWINGS

FIG. 1 is a top view of a 0.75 inch (1.9 cm) finishing tape having single hole apertures;
FIG. 2 is a side view of the finishing tape.

DETAILED DESCRIPTION OF THE PREFERRED EMBODIMENT

Figure 3:
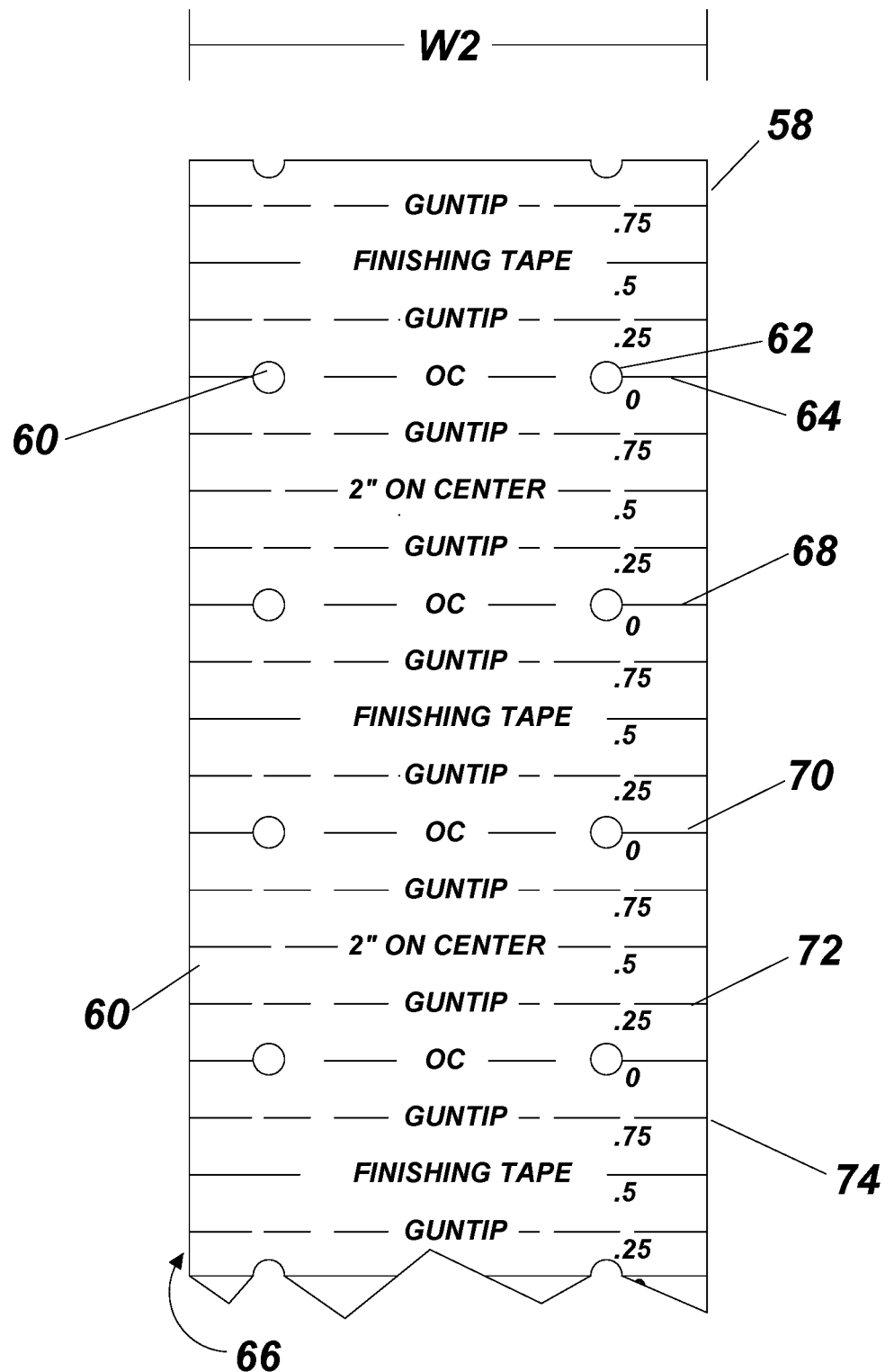
FIG. 3 is a top view of a 1.5 inch (3.8 cm) finishing tape having two hole apertures.

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

The finishing tape of the instant invention is based upon a flexible substrate 10; preferably reinforced paper having printed indicia 12 on a top side 14 and an adhesive 16 on a back side 18. The adhesive 16 is preferably a pressure-sensitive adhesive providing sufficient adhesion and tack to adhere the substrate to another surface with the application of finger pressure. The substrate 10 is coated on the top side 14 with a release agent 13 to permit the tape to be unwound from a roll form 20 without transfer of the adhesive 16 to the top side 14 of the substrate. A release agent such as a silicone based or fluoropolymers prevents permanent attachment of the top side 14 to the adhesive 16 when the finishing tape is rolled up. The indicia 12 is not removed by the adhesive 16. During manufacture, the substrate 10 is printed with indicia such as a linear denotation, and overprinted with a release agent before the adhesive surface contacts when the substrate is placed in a rolled position for each of storage, shipping, and dispensing. Dispensing form a roll format allows for ease in unraveling by hand making it simple to apply to a surface allowing for precision and accuracy of placement. Preferably the substrate is wound around a central core or spool, in a conventional format.

The substrate 10 has a first end 22 separated from a second end 24 by a length L1, and a first edge 26 separated by a second edge 28 by a width W1. The pressure-sensitive adhesive 16 is attached to the back side 18 of the substrate 10, wherein the adhesive 16 is constructed and arranged for adhesion to building construction materials with an adhesive that is selected to provide an "painter's line" edge. The adhesive 16 does not release from the substrate 10 or otherwise contaminate the construction material. On the top side 14, the indicia 12 are equidistantly spaced along the first edge 26 and extending inwardly along the length L1 of the substrate 10; the indicia 12 beginning with a first mark 30 providing a linear denotation and reducing to a zero base line "OC" 32. The first mark 30 is larger than the zero base line 32. In one embodiment the indicia 12 includes a 0.75 inch (1.9 cm) marker (34); reducing to 0.5 inch (1.3 cm) marker (36); reducing to a 0.25 inch (0.6 cm) marker 38. The indicia 12 are provided with high contrast marking to effect distinct visual contrast relative to the spacing.

Apertures 40 are placed at every zero base line "OC" 32 along the length L1 of the substrate 10; each aperture 40 having a gun tip "GT" marking 44, 46 providing a visual indication where to position a fastener gun tip to assure the fastener is centered over the aperture providing a template for placement of fasteners. The indicia serve as visual templates for establishing proper location for fastener placement to attach a finishing construction member. The substrate 10 is adhesively affixed to the construction member, wherein fastener placement is positioned per the manufacture's specifications. The indicia are equidistantly spaced every ¼ inch along the first edge 26 of the flexible substrate 10 and, in a preferred embodiment, the indicia are spaced every ¼ inch along the second edge 28 of the flexible substrate. The extent has the 1-inch first mark 30 reducing to the zero base line 32 by indicia spaced by ¼ inch increments.

The substrate 10 has apertures 50 spaced apart by 1 inch with markings of 2 inch on center 52. In one embodiment depicted in FIG. 1, each aperture 50 is centrally disposed between the first edge 26 and the second edge 28. The apertures can be stamped or laser cut during manufacturing. Once the substrate is positioned, an installer inserts a fastener into each aperture, using the gun tip 44, 46 for aligning the fastener gun. After the fasteners are installed, the fastener can be coated with caulk, putty, paint, stain or the like depending on the application. The aperture assures that the coating spread is limited to the diameter of the aperture, leaving perfectly rounded apertures that are symmetrical in placement. It is well known that coating may not match the construction element, or may fade over time, either due to differences in material or coating, or the mismatch could be intentional to replicate plugs. The finishing tape of the instant invention assures that the coating cover is symmetrical and limited to the fastener by limiting caulking/painting to the aperture area and masking the surround area.

In the expanded embodiment depicted in FIG. 3, a tape 58 is illustrated wherein the width W2 is 1.5 inches (3.8 cm) with apertures 60 and 62 positioned side by side at 1 inch (2.54 cm) increments 64. Similarly to FIGS. 1 & 2, adhesive 16 is placed on the back side 66 and the indicia on the front side 68; the indicia having a release coating to prevent attachment to the adhesive. The indicia include a 1 inch line 68 and ¼ inch (0.6 cm) increments to a zero base line 70. The gun tip alignment lines 72, 74 are positioned on each side of the aperture 60 for proper fastener placement.

Figure 4:
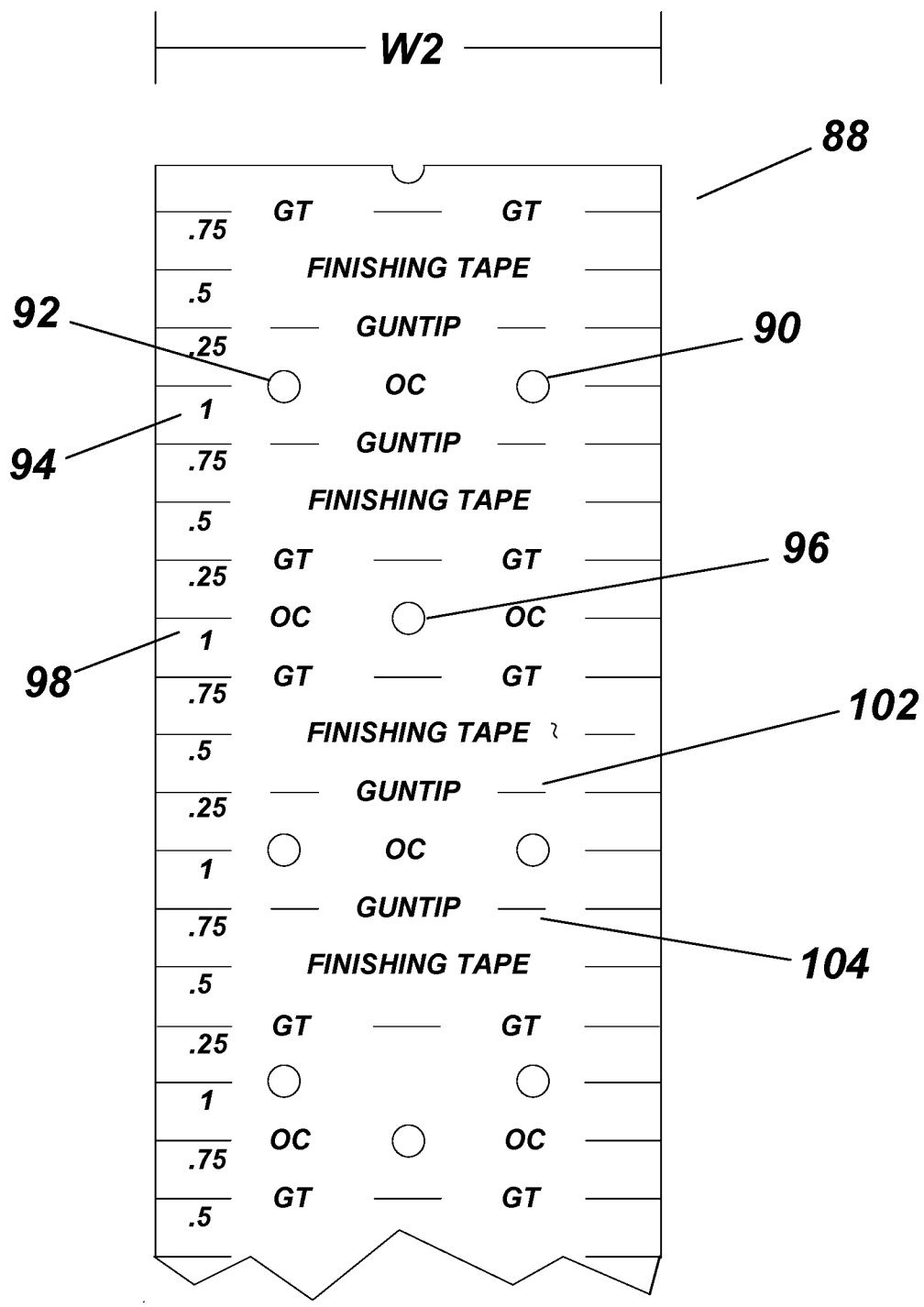
FIG. 4 is a top view of a 3 inch (7.6 cm) finishing tape having alternating apertures.

FIG. 4 illustrates a tape 88 wherein the width W3 is 3 inches with apertures 90 and 92 positioned side by side at 2 inch (5 cm) increments 94, which alternates with a single aperture 96 on alternate 2 inch (5 cm) increments 98. Similar to the previous illustrations, gun tip markings 102, 104 are positioned on each side of the apertures to assure proper gun tip placement. A 6 inch (15.2 cm) width, not shown, is further contemplated as a preferred size, the indicia regarding the apertures and gun tip placement remains the same. It is understood that modifications to the indicia are within the scope of this invention. Apertures within the tape, which doubles as masking tape, assures finishing of the construction on center and providing symmetrical location of the fasteners.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A finishing tape comprising:
   a flexible substrate (10) defined by a top side (14), a back side (18), a first end (22) separated from a second end (24) by a length (L1), and a first edge (26) separated by a second edge (28) by a width (W1);
   pressure-sensitive adhesive (16) attached to the back side (18) of said flexible substrate (10);
   indicia (12) imprinted on the top side (14), said indicia (12) including equidistantly spaced markings along said first edge (26) and extending inwardly along said length (L1) of said substrate (10), said indicia (12) beginning with a first mark (30) reducing to a zero base line mark (32), said first mark (30) larger in linear denotation than said zero base line mark (32), said top surface and indicia coated with a release agent to reduce adhesive adhesion;
   a plurality of apertures (40) equidistantly spaced from each zero base line mark (32) along the length (L1) of said flexible substrate (10), each said aperture (40) having a gun tip alignment line (72);

wherein said substrate (10) is releaseably secured to a surface along a desired path with said indicia (12) serving as visual templates for attachment a finishing construction member to the surface.

2. The finishing tape according to claim 1 wherein said indicia (12) are equidistantly spaced every ¼ inch (0.6 cm) along said first edge (26) of said flexible substrate (10).

3. The finishing tape according to claim 2 wherein said indicia (12) are equidistantly spaced every ¼ inch (0.6 cm) along said second edge (28) of said flexible substrate (10).

4. The finishing tape according to claim 1 wherein an indicia (12) has a 1-inch (2.54 cm) marking (64) reducing to the zero base line mark (32) by indicia (12) equidistantly spaced by ¼ inch (0.6 cm) increments.

5. The finishing tape according to claim 1 wherein apertures are equidistantly spaced apart by 2 inches (5 cm) marking (94) between said zero base line mark (32) along the length (L1) of said flexible substrate (10).

6. The finishing tape according to claim 1 wherein each said aperture is centrally disposed between said first edge and said second edge along the length of the substrate.

7. The finishing tape according to claim 1 wherein at least two apertures are juxtapositioned between said first edge and said second edge.

8. The finishing tape according to claim 1 wherein said apertures alternate between at least two apertures (90, 92) juxtapositioned between said first edge (26) and said second edge (28) and one centrally disposed aperture (96).

9. The finishing tape according to claim 1 wherein the width (W1) of said substrate (10) is 0.75 inches (1.9 cm).

10. The finishing tape according to claim 1 wherein the width (W1) of said substrate (10) is 1.5 inches (3.8 cm).

11. The finishing tape according to claim 1 wherein the width (W1) of said substrate (10) is 3 inches (7.6 cm).

12. The finishing tape according to claim 1 wherein the width (W1) of said substrate (10) is 6 inches (15.2 cm).

13. A finishing tape comprising:

a flexible substrate (10) defined by a top side (14), a back side (18), a first end (22) separated from a second end (24) by a length (L1), and a first edge (26) separated by a second edge (28) by a width (W1);

pressure-sensitive adhesive (16) attached to the back side (18) of said flexible substrate (10);

indicia (12) imprinted on the top side (14), said indicia (12) equidistantly spaced along said first edge (26) and extending inwardly along said length (L1) of said substrate (10), said indicia (12) beginning with a first mark (30) reducing to a zero base line mark (32), said first mark (30) larger in linear denotation than said zero base line mark (32), said indicia being provided with high contrast marking to provide a visual contrast;

indicia (12) are equidistantly spaced in ¼ inch increments along an edge of said flexible substrate, said indicia (12) have a 1-inch first mark (30) reducing to a 0.75 inch (1.9 cm) marker (34); reducing to 0.5 inch (1.3 cm) marker (36); reducing to a 0.25 inch (0.6 cm) marker 38, reducing to a zero base line mark (32), said top surface and indicia coated with a release agent to reduce adhesive adhesion;

a plurality of apertures (40) equidistantly spaced from each zero base line (32) along the length (L1) of said flexible substrate (10), each said aperture (40) having a gun tip alignment line (72) positioned adjacent to said aperture (40);

wherein said substrate (10) is releaseably secured to a surface along a desired path with said indicia (12) serving as visual templates for attachment a finishing construction member to the surface.

14. The finishing tape according to claim 13 wherein apertures (40) are equidistantly spaced apart by 2 inches (5 cm) between said zero base line mark along the length of said flexible substrate.

15. The finishing tape according to claim 13 wherein each said aperture (40) is centrally disposed between said first edge (26) and said second edge (28) along the length (L1) of the substrate (10).

16. The finishing tape according to claim 13 wherein at least two apertures (90, 92) are juxtapositioned between said first edge (26) and said second edge (28).

17. The finishing tape according to claim 16 wherein a centrally disposed aperture (96) is alternated between said two apertures (90, 92) along the length (W1) of the substrate (10).

18. The finishing tape according to claim 1 wherein the width of said substrate is between 0.75 inches (1.9 cm) and 6 inches (15.2 cm) wide.

* * * * *